J. B. ASHLEY.

Carriage-Spring.

No. 71,118.  Patented Nov. 19, 1867.

Witnesses  
J. Augustus Brown  
Th. C. W. White

Inventor  
Joshia B. Ashley

United States Patent Office.

JOSHUA B. ASHLEY, OF NEW BEDFORD, MASSACHUSETTS, ASSIGNOR TO HIMSELF AND J. AUGUSTUS BROWNELL, OF SAME PLACE.

Letters Patent No. 71,118, dated November 19, 1867.

IMPROVEMENT IN CARRIAGE-SPRINGS.

The Schedule referred to in these Letters Patent and making part of the same.

TO ALL WHOM IT MAY CONCERN:

Be it known that I, JOSHUA B. ASHLEY, of New Bedford, in the county of Bristol, in the State of Massachusetts, have invented a new and improved Mode of Breaking Metallic Connections in Elliptic or other Carriage-Springs; and I do hereby declare that the following is a full and exact description thereof, reference being had to the accompanying drawings, and to the letters of reference marked thereon.

My invention consists in breaking the metallic connection of the bolts of elliptic and other carriage-springs, by packing their bearings with rubber or any elastic material, to prevent jarring and to secure ease in riding.

Figure 1:
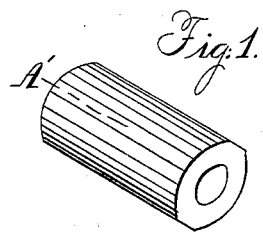
Figure 1 is a perspective view of an elastic rubber cylinder.

Fig. 1. $A^1$ is a rubber cylinder or packing.

Figure 2:
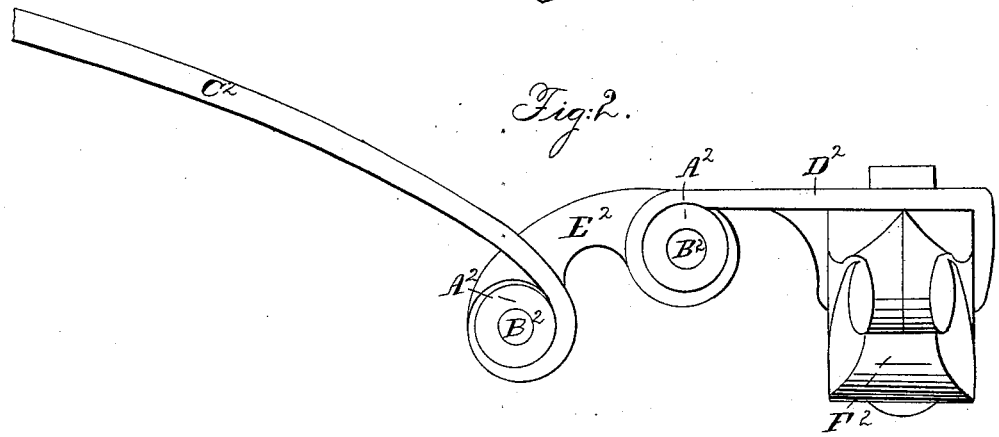
Figure 2 is a longitudinal section of a side spring of a carriage, showing also linking-plate, clip-iron, rocker, and packing.

Fig. 2. $A^2$ is the rubber cylinder or packing; $B^2 B^2$, bolts; $C^2$, side spring; $D^2$, clip-iron; $E^2$, linking-plate; $F^2$, rocker.

Figure 3:
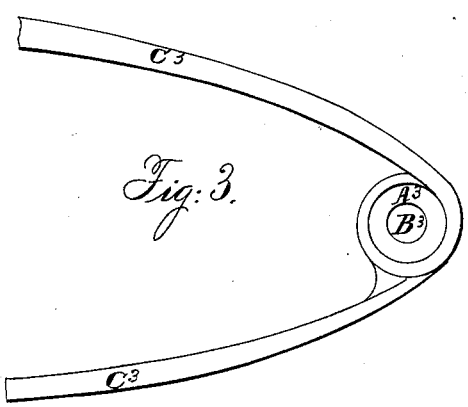
Figure 3 is a longitudinal section of an elliptic spring.

Fig. 3. $A^3$, rubber cylinder; $B^3$, bolt; $C^3 C^3$, elliptic spring.

The springs of carriages being constructed in the usual manner, the application and novelty of my invention may be noted. That part of the spring which admits the bolt to form the joint is coiled sufficiently large to admit the rubber cylinder $A^1$, and a bolt is inserted through the cylinder, which breaks the metallic connection of bolt and spring. By this device the spring is much less liable to break, as it is relieved from any sudden and violent blow caused by the carriage coming in contact with any obstruction; and, finally, the application of my invention will cause a stiff spring to be as easy with a light load as with a heavy one.

In this invention, I do not confine myself to packing the joints with rubber; any elastic material may be used; neither do I claim any device previously invented or patented to ease the hard and rough jarring of carriages; but

What I claim as my invention, and desire to secure by Letters Patent, is—

The spring $C^2$, and linking-plate $E^2$, and clip-iron $D^2$, in combination with the packing $A^1 A^2$, and bolts $B^2 B^2$, all arranged and applied substantially as and for the purpose described.

JOSHUA B. ASHLEY.

Witnesses:
FRANK B. GREENE,
WENDELL H. COBB.